United States Patent
Blum et al.

(10) Patent No.: US 7,763,373 B2
(45) Date of Patent: Jul. 27, 2010

(54) METHOD FOR PRODUCING AN ELECTRODE ARRANGEMENT FOR USE IN A FUEL CELL

(75) Inventors: Stephen Blum, Düsseldorf (DE); Robert Heggemann, Paderborn (DE); Bernd Luhrs, Büren (DE)

(73) Assignee: 2S-Sophisticated Systems Limited, London (GB)

( * ) Notice: Subject to any disclaimer, the term of this patent is extended or adjusted under 35 U.S.C. 154(b) by 807 days.

(21) Appl. No.: 11/523,345

(22) Filed: Sep. 19, 2006

(65) Prior Publication Data

US 2007/0072054 A1 Mar. 29, 2007

Related U.S. Application Data

(62) Division of application No. 10/110,503, filed as application No. PCT/DE01/03003 on Aug. 13, 2001, now Pat. No. 7,132,190.

(30) Foreign Application Priority Data

Aug. 14, 2000 (DE) ................ 100 40 282

(51) Int. Cl.
*H01M 4/90* (2006.01)
(52) U.S. Cl. ............... 429/40; 429/44; 502/101
(58) Field of Classification Search ............... 29/623.1; 429/40, 41, 42, 30, 44; 502/101; 422/211; 428/34.1, 35.2
See application file for complete search history.

(56) References Cited

U.S. PATENT DOCUMENTS

| 3,228,797 | A |   | 1/1966 | Brown et al. |
| 3,423,243 | A |   | 1/1969 | Kordesch et al. |
| 4,420,544 | A |   | 12/1983 | Lawson et al. |
| 4,555,324 | A | * | 11/1985 | Ueno et al. ............... 204/284 |
| 4,734,342 | A |   | 3/1988 | Seiger |
| 5,338,320 | A | * | 8/1994 | Fukuda et al. .......... 29/623.1 |
| 5,532,083 | A |   | 7/1996 | McCullough |
| 5,928,808 | A | * | 7/1999 | Eshraghi ............... 429/41 |
| 2002/0028367 | A1 |   | 3/2002 | Sammes et al. |

FOREIGN PATENT DOCUMENTS

| EP | 0 376 579 |   | 7/1990 |
| JP | 57-210571 | * | 12/1982 |

* cited by examiner

*Primary Examiner*—Raymond Alejandro
(74) *Attorney, Agent, or Firm*—Cohen Pontani Lieberman & Pavane LLP

(57) ABSTRACT

A method for producing an electrode arrangement for use in a fuel cell. The method includes providing a filament comprising a supporting core and a plurality of webs extending radially from the core, the filament forming a radially internal, electrically conductive first electrode; and pulling a woven stocking over the filament.

10 Claims, 6 Drawing Sheets

METHOD FOR PRODUCING AN ELECTRODE ARRANGEMENT FOR USE IN A FUEL CELL

CROSS-REFERENCE TO RELATED APPLICATIONS

This is a divisional of U.S. patent application Ser. No. 10/110,503 filed Dec. 3, 2002, now issued as U.S. Pat. No. 7,132,190, Nov. 7, 2006, which is a U.S. national stage of International Application No. PCT/DE01/03003, filed on Aug. 13, 2001. Priority is claimed on German Application No. 100 40 282.8, filed on Aug. 14, 2000. The entire content of application Ser. No. 10/110,503 is incorporated herein by reference.

BACKGROUND OF THE INVENTION

1. Field of the Invention

The invention relates to a microreactor, as is used in particular in an electrode arrangement of a fuel cell, and which can preferably also be constructed in the form of a so-called cartridge, in which fiber bundles, which are mounted in a cage between two head plates, are connected in parallel as individual electricity-producing cells.

2. Description of the Related Art

Both gases and liquids are used as fuel components for producing electricity in fuel cells, are supplied to at least two electrodes, an anode and a cathode, and are catalytically broken down there into ions and electrons. In this case, the transportation of ions must be physically separated from the transportation of electrons and, in general, the ions are transported within an electrolyte and the electrons are supplied and carried away by means of conductive electrodes, the cathode or cathodes and the anode or anodes, which are also referred to as collectors in this context.

The ion-conductive electrolytes can disassociate and in the process form H+ or OH— ions. Such electrolytes may be liquid materials such as alkaline aqueous alkali solutions, for example, KOH, or aqueous acids, for example, $H_2SO_4$, or solid ion-conducting materials, for example membranes. In this case, alkaline electrolytes conduct anions, while acidic electrolytes conduct cations.

Two types of fuel cells are favored at the moment, which both use oxygen as the fuel component, with the hydrogen cell using hydrogen as a further fuel component, and with the direct methanol cell, frequently referred to as a DMFC for short, using methanol as a further fuel component. In hydrogen cells, hydrogen is first of all produced by reformers from methanol, before it can be converted into electricity in the fuel cell. In direct methanol cells, methanol is supplied directly as the fuel component.

The reactions which occur in this case are as follows:

Hydrogen/oxygen cell:
Anode reaction: $H2 \Rightarrow 2H^+ + 2e^-$ (oxidation)
Cathode reaction: $O_2 + 4H^+ + 4e^- \Rightarrow 2H_2O$ (reduction)

$MeOH/O_2$ cell:
Anode reaction: $CH_3OH + H_2O \Rightarrow CO_2 + 6H^+ + 6e^-$ (oxidation)
Cathode reaction: $1.5O_2 + 6H^+ + 6e^- \Rightarrow 3H_2O$ (reduction)

U.S. Pat. No. 4,100,331 discloses a hydrogen fuel cell, in which hydrogen and oxygen are introduced, as fuel components, into separate, tubular membranes, which have a catalyst on the inside. Furthermore, an electrode is in each case arranged in a spiral shape within the membrane, with oxygen flowing around the cathode and hydrogen flowing around the anode, via which an electric current can be tapped off. The respective arrangements of the membrane, catalyst and electrode are aligned parallel to one another within an electrolyte in the fuel cell disclosed there.

U.S. Pat. No. 4,420,544 discloses a direct methanol cell in which, once again in an electrolyte, namely, $H_2SO_4$, a membrane is arranged with an internal catalyst coating. A spiral wire electrode is surrounded by the membrane, and oxygen flows against this wire electrode. Methanol is furthermore introduced into the electrolyte, and the disassociation process takes place between the spiral wire electrode and an electrode which is immersed in the electrolyte, is at a distance from the membrane and extends flat.

In a further exemplary embodiment, the electrode which is immersed in the electrolyte is in this case likewise spiral and is wound around the outer casing of the membrane.

In a comparable manner to a battery cell, such fuel cells can be connected in series in order to increase the voltage or in parallel in order to increase the power. Particularly when they are connected in parallel, the cartridges mentioned initially are expedient, in which membrane modules are used, such as those which are known from DE 44 38 327 and from DE 44 01 014.

Comparable circuits are known from WO 00/54358. There, a fuel component flows through a coaxial, tubular electrode arrangement. The microreactor on which this is based is in the form of a tubular assembly, in which a radially internal hollow mesh composed of bundles and/or wires of a material which conducts electrons forms an inner electrode, through which a fuel component flows. A catalyst layer is applied to the electrode, and a layer of a material which conducts ions is applied to this catalyst layer. This layer of a material which conducts ions in turn has a catalyst layer which is enclosed by a further hollow mesh composed of a material which conducts electrons, as the opposing electrode, with the different layers/materials being arranged such that they rest directly on one another.

A central metal wire with projections can be incorporated in the lumen of the internal hollow mesh, by means of which projections an electrical contact is produced between the wire and the internal hollow mesh, for a current output. Furthermore, the wire or wires is or are used to stabilize the tubular assembly.

In addition to the mechanical robustness, a problem which normally occurs in the fuel cell is that the power yield which it allows is only small since membrane surfaces, in particular, are normally limited in the same way as catalytic reaction areas, as well, in particular the so-called three-phase zone as a contact zone.

SUMMARY OF THE INVENTION

Against this technical background, the invention has the object of providing a microreactor which can be subjected to a high electrical load and is mechanically robust, for an electrode arrangement for a fuel cell.

This technical problem is solved by a microreactor based on a filament against which a fuel component flows in at least one flow channel and which, in the form of a radially internal, electrically conductive electrode of the microreactor, is connected to a radially external membrane and is fitted with this membrane such that it supports this membrane, with the radially internal envelope surface of the membrane being separated from a supporting core of the filament by axially extending webs, thus forming flow channels.

The supporting connection between the membrane and the filament first of all results in a high level of mechanical robustness. In particular, the microreactor can also be designed to be self-supporting. There is no need for any separately introduced wires, in particular to provide robustness for the microreactor.

Furthermore, a very large filament surface area, against which a fuel component flows, is now advantageously available, and hence a large reaction surface area. For this purpose, the surface of the filament can be provided with a suitable catalyst, or the filament itself may be composed of, or may contain a catalytically activated material.

This is achieved by physical structuring of the filament, which may have a core around which, and possibly also through which, the fuel component flows and from which webs originate, like spokes when seen in cross section. These webs act as spacers between the membrane and the core, forming flow channels between the webs of the filament, which is used as an electrode, and the membrane, thus ensuring that a fuel component flows well onto large catalytically active surfaces.

The free ends of the webs, suitably designed, and possibly also branching further, can support the membrane directly. Alternatively, the free ends are provided with radially extending attachments, on which the membrane is supported. The radially external envelope surfaces of the attachments, possibly in the same way as the free ends of the webs, form an outer casing surface for the filament, from which the radially internal envelope surface of the membrane can also be spaced apart, at least in places, so that a flow channel is also formed, at least in these sections.

The filament and the webs are preferably formed integrally, and the webs also extend like ribs over the entire axial length of the filament. At the free ends of the webs and on circumferentially extending attachments provided there, the membrane is preferably further supported via crystallites of a catalyst. If, however, it is provided for the filament to be tubular or solid like the core itself, a spacing between the radially internal envelope surface of the membrane and the outer envelope wall of the filament can be provided by separately formed webs.

In the microreactor according to the invention, such spacing is preferably achieved by the measure that webs, which themselves are composed of, contain or have crystallites of a catalyst, support the membrane, at least in places, at a distance from the envelope surface of the filament.

If the circumferentially extending attachments of the webs are closed circumferentially, so that the filament has a number of axially extending closed lumina, it is not absolutely necessary for a flow channel to be formed between the inner envelope wall of the membrane and the outer envelope wall of the filament, since the core, in particular a central, solid core, provides a large number of flow channels, with a large surface area, with its outgoing webs and the radially internal surfaces of the attachments. The filament is then, of course, formed from a porous material and/or from a mesh which has permeable interstices. However, the membrane is in this case preferably spaced apart from the filament by the crystallites of a catalyst.

In principle, the surface area against which the fuel component flows in a microreactor can also be enlarged, according to the invention, by the measure of the filament having cross sections which are twisted about its longitudinal axis in one axial extent. At least in places, the filament can thus be formed to be uniformly helical about one longitudinal axis, as a result of which the webs, which then run like spirals, have a greater length than the total axial extent of the filament.

In an electrode arrangement having a microreactor as described above, in particular for a fuel cell, it is possible to provide for the membrane to be arranged at a radial distance in an electrically conductive hollow filament which forms a second electrode, so that at least one flow channel is also formed between the outer envelope wall of the membrane and the radially internal envelope surface of the outer electrode.

The microreactor with a radially internal electrode, held by an opposing electrode which is arranged radially on the outside, in particular coaxially, thus form a compact cell unit for a fuel cell.

A connection between the radially external electrode and the microreactor is preferably produced in turn in that the webs, which themselves are composed of, contain or have crystallites of a catalyst, are fitted with the electrically conductive hollow filament as the electrode at a distance from the outer envelope surface of the membrane. There is then no need for any special structural measures.

In the microreactor and/or the electrode arrangement according to the invention, provision is made for the radially internal electrode to project axially at at least one end, in particular beyond the second electrode. A microreactor can thus be held in a simple manner and a number of microreactors and/or electrode arrangements can be interconnected by means of a link, which is in each case formed at one end and is in particular electrically conductive, from electrodes of a microreactor to a head plate which is at right angles to the electrodes.

A head plate such as this is preferably itself designed to be conductive. Held at one end of the head plate, the electrodes in each case preferably end at the other end free from the head plate there. This precludes any short circuit between the head plates through the conductive electrodes. This is made possible in particular by coaxial electrode arrangements which are designed such that they are not offset at one end while they are designed at the other end to be male, preferably female/male or male/male.

The filaments and/or electrodes which, in particular, are self-supporting are suitable for supporting the membrane and/or a catalyst. Furthermore, the membrane is no longer the supporting component holding the head plates at a distance, with this in fact being ensured by the configuration of the electrodes or of the electrode arrangements. In this case, the intention is in particular for each head plate to be fitted with a large number of microreactors or electrodes which, in the case of an electrically conductive head plate, also no longer need be connected to one another by appropriate connections. This allows them to be connected in parallel easily.

In addition to connecting them in series, the voltage from fuel cells can in this case also be governed by the axial length of the electrodes. The number of electrodes held by one head plate in contrast governs the power, corresponding to individual cells being connected in parallel.

If the electrodes are in the form of hollow fibers, composed of an electrically conductive material of course, the tube wall of the electrodes is designed to be porous. This can be achieved, for example, by using an electrode composed of a ceramic. A further preferred material for the electrodes is materials containing carbon, in particular carbon fibers, which may also be woven, with the woven structure at the same time producing a certain amount of permeability, thus allowing the necessary diffusion through the tube walls. A contact surface area that is a large as possible, the so-called three-phase zone, is thus formed.

The coaxially internal electrode is provided with a catalyst on its outside and/or the coaxially external electrode is provided with a catalyst on its inside. Such catalysts, matched to the fuel components, are known from the prior art.

The same applies to the material for a membrane, which is preferably provided arranged coaxially in a gap between the internal and outer electrode. The gap size is between 1 μm and 200 μm, also corresponding to the thickness of the membrane. In this case, the intention is also in particular for the membrane to act at the same time as an insulator between the coaxially arranged electrodes.

If the radially internal electrode of a microreactor, in particular of an electrode arrangement, projects axially, two directly adjacent head plates can be provided at at least one end of microreactors or of the electrode arrangement. In this case, the axially outer head plate will preferably interconnect the radially internal electrodes of the microreactors. The second, axially internal head plate can, for example, be connected directly to the first head plate, and may be in the form of an insulator. In particular, it is possible to reliably avoid any short circuit between the two electrodes of an electrode arrangement if a head plate such as this covers the outlet of the radially internal electrode, providing insulation, and reliably keeps the radially outer electrode away from the conductive outer head plate.

Alternatively, the immediately adjacent head plates may each be designed to be electrically conductive and may be arranged such that they are electrically isolated from one another, which allows the electrical connection of an electrode arrangement on one side. To this end, the axially external head plate will hold the radially internal electrodes, and the axially internal head plate will hold the radially external electrodes.

In a case such as this, it has been found to be worthwhile for two immediately adjacent conductive head plates to be electrically isolated from one another and to be mechanically connected to one another by means of a third, non-conductive head plate arranged between them. This results in a compact connection, which is mechanically robust and electrically stable.

In particular, a further aim may be to arrange such combinations of head plates at both ends of the microreactors of an electrode arrangement, which makes it possible to achieve microreactors with a large axial length, even if they have a comparatively high electrical resistance.

A head plate is expediently composed of a resin, which can be adjusted such that it is conductive or non-conductive. It is thus simple to produce such combinations of head plates by casting in resins.

In addition to the coaxial arrangement of the electrodes, it is possible in a further embodiment variant to provide a large number of tubular microreactors through which a fuel component flows, in particular microreactors of the type explained initially, held such that they are spaced radially from one or more concentrically arranged electrodes. In principle, the large number of microreactors against which a fuel component flows can be formed in the manner explained above, that is to say in particular being linked at one end to a head plate, and being self-supporting, while the one or more concentrically arranged second electrode or electrodes is or are held arranged on an opposite head plate.

In order to produce a microreactor, in particular for use in a fuel cell with the electrode arrangements explained initially, a hollow fiber or filament which is provided with a catalyst is expediently provided with a membrane as a first electrode, and a woven stocking, which is placed over the microreactor, is brought into close contact with the microreactor, as the second electrode, by pulling.

The hollow fiber or the filament is preferably produced from a fiber containing a catalyst.

Alternative and/or additionally, catalyst particles can be introduced into the pores of the stocking, which have been enlarged by upsetting.

BRIEF DESCRIPTION OF THE DRAWINGS

The invention will be explained in more detail with reference to the drawing, which illustrates only exemplary embodiments.

In the drawing:

FIG. 18: shows a third exemplary embodiment while

DESCRIPTION OF THE PRESENTLY PREFERRED EMBODIMENTS

Filament cross sections of preferred embodiments will be explained in more detail with reference to FIGS. 1 to 8. The filaments form an electrically conductive, central electrode of a microreactor according to the invention. For this purpose, the filaments are furthermore connected to a radially external membrane, and are self-supporting.

Figure 1:
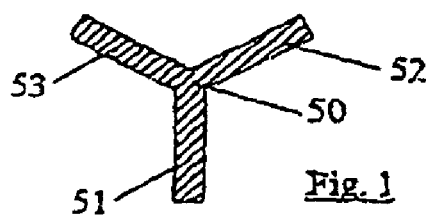
FIGS. 1 to 8 show various filament cross sections.

FIG. 1 shows a simple Y-shaped cross section, in which three webs 51-53 are fitted, spaced apart uniformly, to a core 50. Three flow channels are formed between the webs 51, 52, as well as 52, 53 and 53, 51, and are further closed radially on the outside by a membrane, which is not shown.

Figure 2:
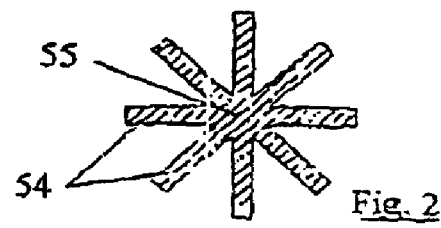

One development is shown by the filament cross section in FIG. 2, in which a large number of webs 54 originate like beams from a core 55.

Figure 3:
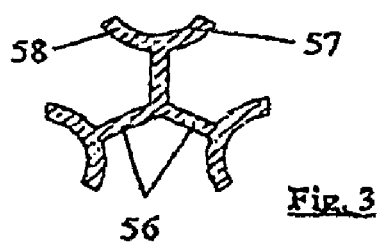

Outgoing webs 56 can, furthermore, branch off, for example into two branches 57, 58 in FIG. 3. The number of flow channels can thus be increased, being doubled in the exemplary embodiment shown in FIG. 3. In addition, the number of support points for the radially external membrane is increased, in this case being doubled.

Figure 4:
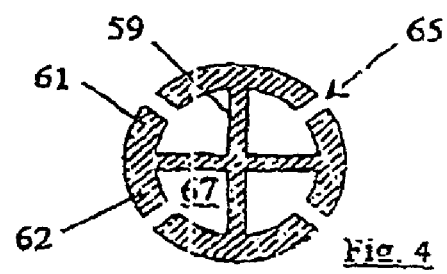
Figure 5:
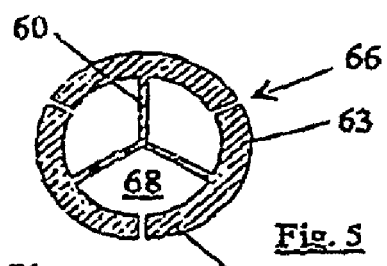

FIG. 4 and FIG. 5 likewise show branches of the webs 59 and 60. The branching process at the free ends of the webs 59 and 60 results in circumferentially projecting attachments 61, 62 and 63, 64 as supports for the membrane.

The attachments 61, 62 and 63, 64 are each separated from the adjacent attachments. The fuel component flowing through the respective flow channels 67 and 68 can thus come into direct contact with the membrane, and with a catalyst arranged there, through respective gaps 65 and 66.

Figure 6:
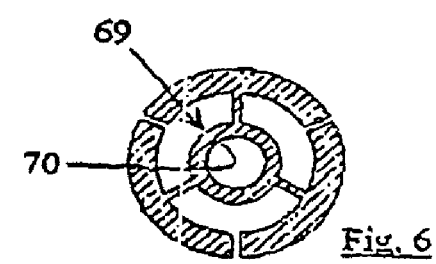
Figure 8:
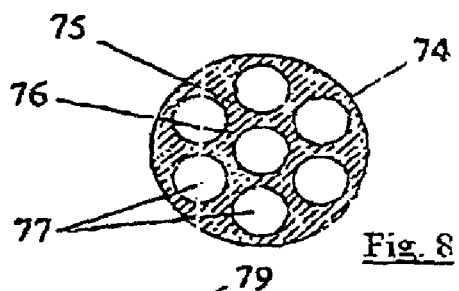

A further flow channel 70 can itself once again be formed in a core 69, with corresponding dimensions, as shown in FIG. 6 and FIG. 8.

Figure 7:
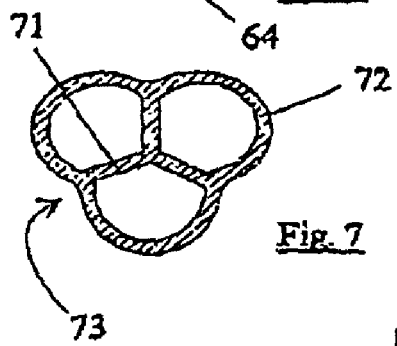

FIG. 7 shows a mixed form of branching and the formation of attachments at the free ends of the webs 71. The attachments shown there are closed radially circumferentially, so that a continuous radially external envelope surface 72 is formed which, provided with a catalyst, supports a membrane. This membrane may be formed, but need not be formed everywhere, (for example in the region of indentations 73 of the envelope surface 72) to be in contact with the filament and the catalyst.

The filament shown in FIG. 8 has a circular-cylindrical envelope surface 74. This avoids sharp corners between the webs 75 and a core 76. The junctions between the webs 75 and the circumferential attachments which are closed in annular shape are also rounded, thus forming flow channels 77 with very largely round cross sections.

Figure 9:
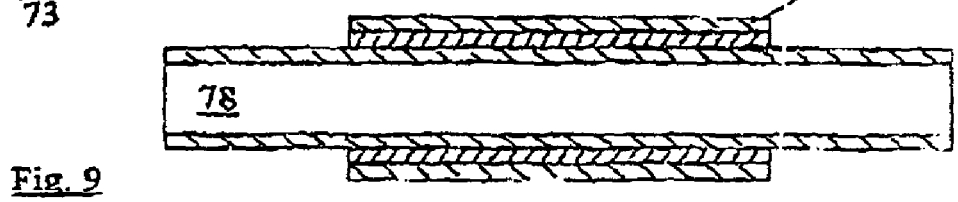
FIG. 9: shows a male-male electrode arrangement.
Figure 10:
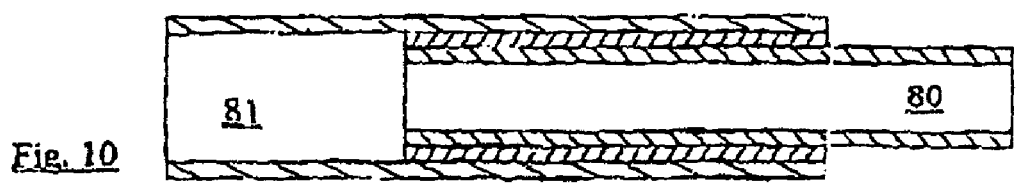
FIG. 10: shows a female-male electrode arrangement.

FIGS. 9 and 10 show the basic, coaxial construction of a microreactor and, respectively, of an electrode arrangement, with the central element being indicated only in tubular form, for the sake of clarity. In FIG. 9, the filament 78 which is used as an electrode, preferably as an anode, projects on both sides axially beyond the radially external electrode 79, preferably the cathode, a male/male arrangement. On the right, FIG. 10 also shows the radially inner electrode 80, and possibly also the microreactor according to the invention, projecting axially beyond the radially outer electrode 81. At the other end, the external and internal electrode can end identically or, as is shown on the left in FIG. 10, the outer electrode 81 projects axially beyond the inner electrode 80, a female/male arrangement.

Figure 11:
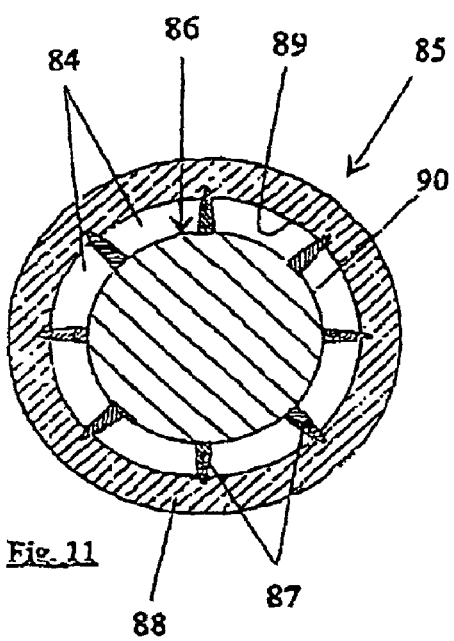
FIG. 11: shows a cross section through a first exemplary embodiment of a microreactor.

FIG. 11 shows a cross section through a microreactor 85 according to the invention. A filament 86 with a circular full profile is provided centrally there, and itself forms a core. Tubular profiles are equally suitable. Webs 87 project radially beyond the envelope surface 90 of the filament 86, and in this exemplary embodiment are fitted separately. These webs 87 are preferably formed directly by crystallites of a catalyst. Fitted webs 87 composed of a catalyst or of a material provided with a catalyst are equally possible. The webs 87 support a membrane 88, whose inner envelope surface 89 is separated by the webs 87 from the envelope surface 90 of the filament 86, thus forming flow channels 84 between the envelope surfaces 90, 89.

Figure 12:
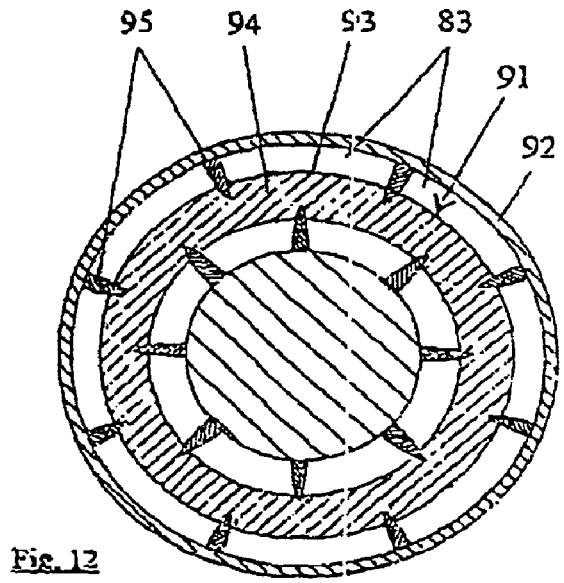
FIG. 12: shows a cross section through an electrode arrangement, based on a microreactor as shown in FIG. 11, FIG. 13: shows a cross section through a second exemplary embodiment of a microreactor.

A microreactor 91 can be arranged coaxially within a further electrode 92. A space between the outer envelope surface 93 of the membrane 94 is produced by means of further webs 95. These webs 95 are designed in a corresponding way to the webs 87, once again preferably being formed from crystallites of a catalyst, see FIG. 12. Further flow channels 83 are thus formed between the outer envelope surface 93 of the membrane 94 and the electrode 92.

Figure 13:
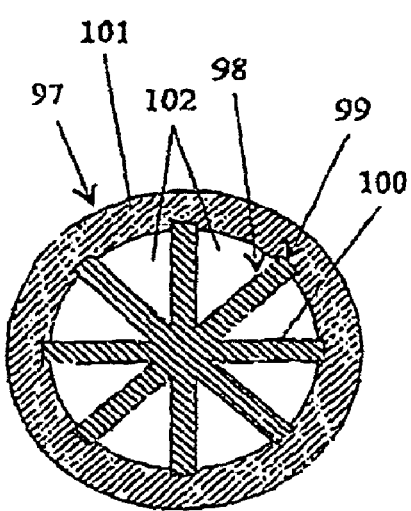

The microreactor 97 shown in FIG. 13 once again makes use of a filament 98 as shown in FIG. 2. The free ends 99 of the webs 100 support a membrane 101, for which purpose, in particular, the free ends 99 can be provided with a catalyst. Flow channels 102 are thus formed between the webs 100 and the inner wall of the membrane 101.

Figure 14:
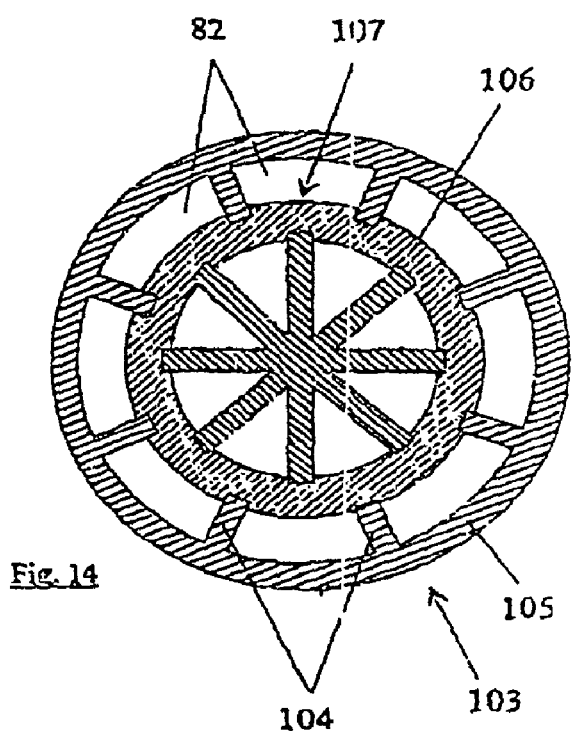
FIG. 14: shows a cross section through an electrode arrangement, based on the microreactor shown in FIG. 13, FIG. 15: shows, schematically, the design of a fuel cell, showing a single cell, according to the invention.

FIG. 14 shows a coaxial type of electrode arrangement 103 based on the microreactor 97. Webs 104 which support a catalyst, formed here with an outer electrode 105, preferably separate the electrode 105 from the microreactor 107, thus forming flow channels 82. A separate configuration of the webs 104, or their association with the membrane 106, is likewise possible.

Figure 15:
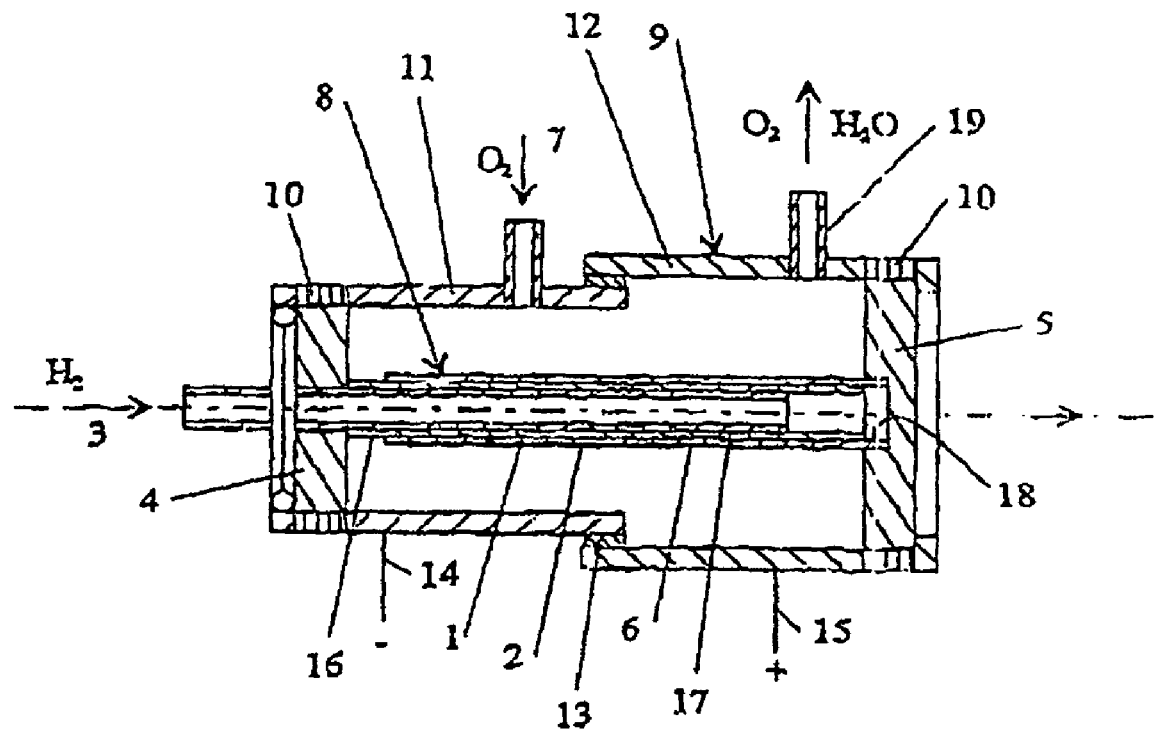

FIG. 15 shows two electrodes 1, 2 arranged in a male/female arrangement, of which the filament forming the electrode 1, the anode, is illustrated only in the form of a tube, by way of example, through which a fuel component flows, as indicated by the arrow 3. In this exemplary embodiment, hydrogen is used as the fuel component.

At one end, on the left-hand side in FIG. 15, the anode 1 is electrically conductively connected to a head plate 4, also referred to as potting.

The anode 1 and the cathode 2 are arranged coaxially, with the cathode 2 likewise being electrically conductively connected at one end, on the right-hand side in FIG. 15, to a second head plate 5. A second fuel component, in this case, oxygen, flows against an external envelope surface 6 of the coaxially external cathode 2, as indicated by the arrow 7. For this purpose, the electrode arrangement 8 comprising the anode 1 and the cathode 2 is introduced into a housing 9 in a gas-tight manner.

If the head plates 4, 5 are designed to be electrically conductive, and the housing 9 is also electrically conductive, then it is possible using simple means, for example brushes 10, to produce an electrical contact between the housing 9 and the head plates 4, 5. To prevent the anode 1 and the cathode 2 from being short-circuited via the housing 9, this housing 9 is designed in two parts, and the housing halves 11, 12 are electrically isolated, but are mechanically connected to one another, via an insulator 13. It is thus also possible to tap current off directly from the housing halves 11, 12 as indicated by electrical conductors 14, 15.

The housing 9 also has an outlet 19, through which oxygen and, as a combustion product, $H_2O$ emerge once again. Apart from this, the interior of the housing 9 is not especially subject to any operating pressure. No especially introduced, liquid electrolyte is used either, since the ions are conducted by the membrane 16. To this extent, the chemical reaction takes place exclusively in the region of the electrode arrangement 8.

If, in particular, the head plates 4, 5 are designed to be electrically conductive, then no electrical short circuit between these head plates 4, 5 can be produced through the electrodes 1, 2 either. This is achieved in a simple way by the measure of the electrodes 1, 2 each being held at one end in a head plate 4, 5 while ending free of the head plate 5, 4 at the other end, that is to say by means of the male/female arrangement.

At least one electrode, and preferably both electrodes, can thus be designed to be appropriately mechanically robust, in particular to be self-supporting as well. This can be achieved by suitable material selection. Conductive ceramics, carbon fibers or the like have been found to be expedient.

The annular circumferential gap produced by the coaxial arrangement between the electrodes 1, 2 has a radial size of approximately 1 µm to 200 µm. A membrane 16 is introduced into this gap. Thus, in contrast to the prior art, the membrane does not perform a supporting function, with this function being carried out here by means of at least one electrode, preferably by means of both electrodes 1, 2.

In addition to the membrane 16, the electrodes 1, 2 also support a catalyst. In this case, the coaxially internal electrode 1 has the catalyst on its outer envelope surface 17 and/or the coaxially external electrode 2 may have the catalyst on its inside 18. In this case, conventional catalysts can be applied, for example, by immersion of the electrodes 1, 2.

In order to allow diffusion and to obtain a large reaction surface area, the tube walls of the electrodes 1, 2 are porous or the electrodes are composed of fiber meshes, which woven structure likewise allows diffusion through the tube walls of the electrodes 1, 2.

In the hydrogen/oxygen fuel cell shown in FIG. 15, the length of the electrodes, in particular, the region of the coaxial overlap, governs the voltage tapped off via the conductors 14, 15.

Figure 16:
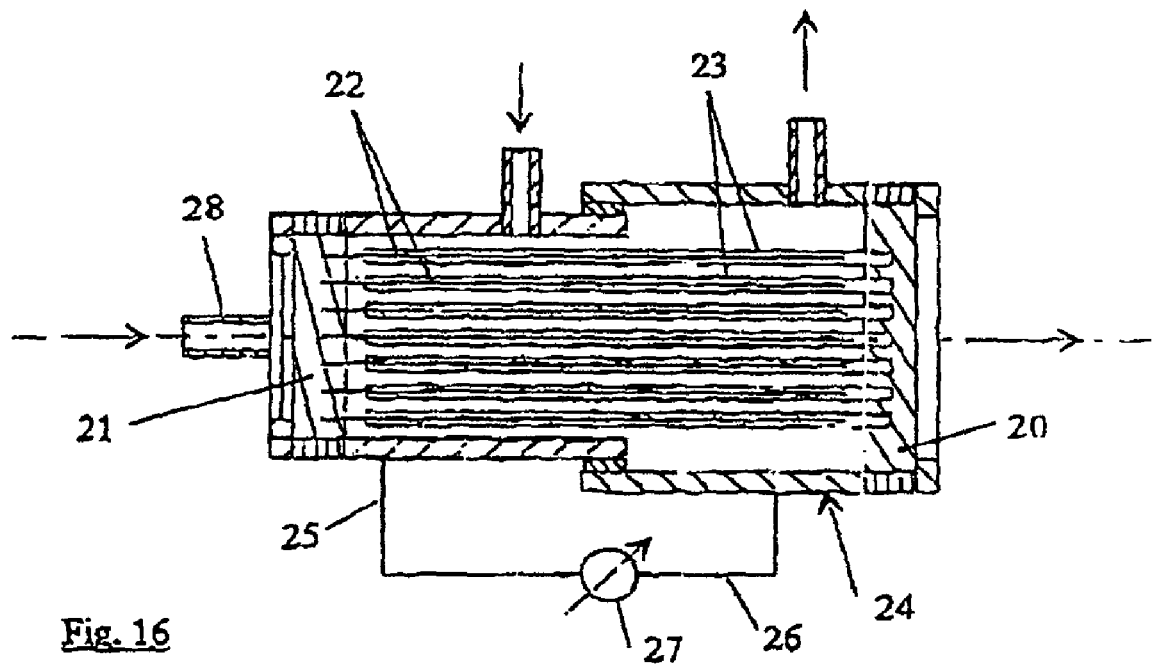
FIG. 16: shows, schematically, a fuel cell having a number of individual cells connected in parallel, according to the invention.

The power in the case of fuel cells is governed by the number of cells connected in parallel. It is thus possible, as shown in FIG. 16, for a large number of microreactors 22 and electrodes 23 to be respectively connected to each head plate 20, 21. The physical structure of the electrode arrangements together with the microreactors 22 and the electrodes 23 corresponds to the electrode arrangement 8 shown in FIG. 15, and has been explained in the introduction. If, in particular, the head plates 20, 21 are designed to be electrically conductive, there is no need to interconnect the electrodes of the microreactor 22 and the electrodes 23. Conductive head plates 20, 21 can be formed by means of conductive plastics, which are likewise suitable for mechanically connecting the electrodes 22, 23, for example by potting them at one end.

The voltage that is produced can be tapped off via a conductive two-part housing 24, and can be supplied via conductors 25, 26 to a load 27. Apart from this, the housing 24 is also constructed in a corresponding manner to the housing 9. A number of housings as shown in FIG. 16 can be connected in series, in a comparable way to batteries, in order to increase the voltage.

Depending on the configuration, the electrodes of the microreactors 22 may pass completely through the head plate 21, so that a fuel component can flow through directly at the end, via a connecting stub 28. In the exemplary embodiment shown in FIG. 16, hydrogen is once again also provided as the fuel component.

Alternatively, it is possible to provide for the bundle of electrodes of the microreactors 22 to be joined together within the head plate 21, and to open jointly in the connecting stub 28.

A corresponding situation applies to any outlet opening which may be provided in the head plate 20.

In the section between the coaxially arranged electrodes, shown in the right-hand half of the figure in FIG. 15, extending axially between the head plate 5 and that end face of the electrode 1 which ends in front of this head plate 5, the membrane 16 carries out a sealing and guidance function such that the fuel component 3 can be passed on within the membrane 16 to the head plate 5 and, if required, can be carried away from there.

The filaments explained initially, in particular forming a number of closed lumina and in the form of hollow fibers, are especially expedient for an embodiment of the electrodes for parallel connection as shown in FIG. 16. Filaments such as these can be woven, and if required also cast, from carbon fibers.

Such electrodes (which form the anode in the exemplary embodiment shown in FIG. 17) of the microreactors 29 in particular according to the invention, but also microreactors of a different type, are first of all coated with a catalyst, and then with a membrane, on their outer envelope surface, for example by immersion. On the left-hand side in FIG. 17, the microreactors 29 formed in this way are mounted in a head plate 30, which is once again designed to be electrically conductive. At the other end, the electrodes of the microreactors 29 are fixed in a non-conductive section 31 of a head plate 32. This section 31 isolates the electrodes 29 from one another, and isolates the electrodes 29 from the opposing electrodes 33, the cathodes. These opposing electrodes 33, in this case by way of example produced in two pieces arranged concentrically, are held in a conductive section 34 of the head plate 32 such that they are conductively connected to one another.

If the design provides for the section 31 to hold the electrodes of the midroreactors 29 conductively, then it may also be necessary to provide insulation between this section 31 and the conductive section 34, which holds the opposing electrodes 33, and the opposing electrodes 33 themselves.

Figure 17:
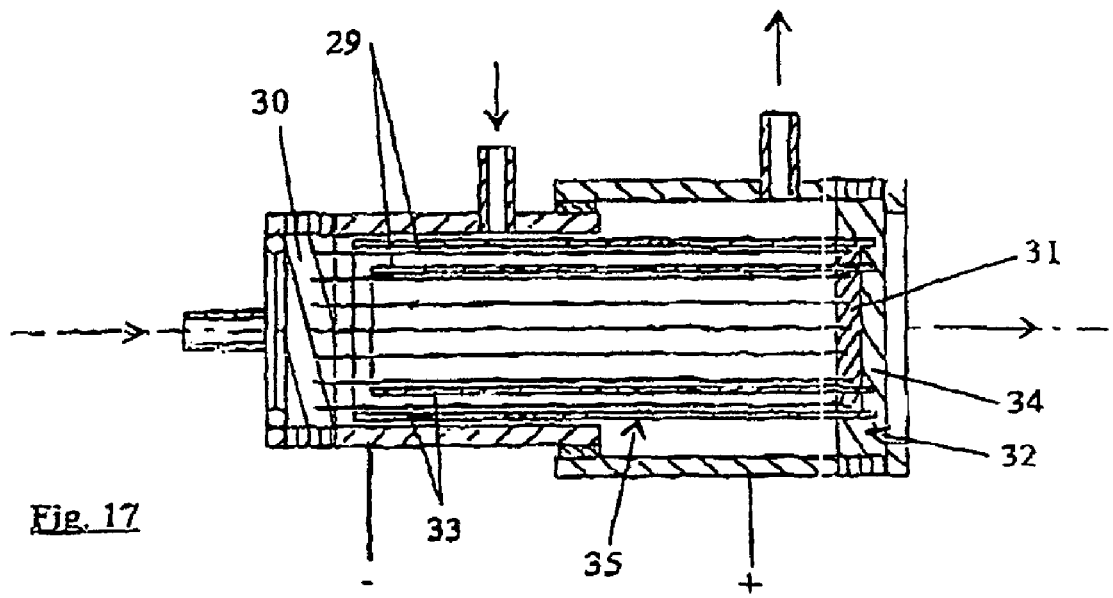
FIG. 17: shows a further exemplary embodiment.

As in the exemplary embodiments explained above, a fuel component flows through the microreactors 29 in the exemplary embodiment shown in FIG. 17 and the electrode arrangement 35 shown in FIG. 17 is introduced into a housing through which the second fuel component flows, so that the ion interchange and electron interchange of the fuel cell can take place.

Figure 18:
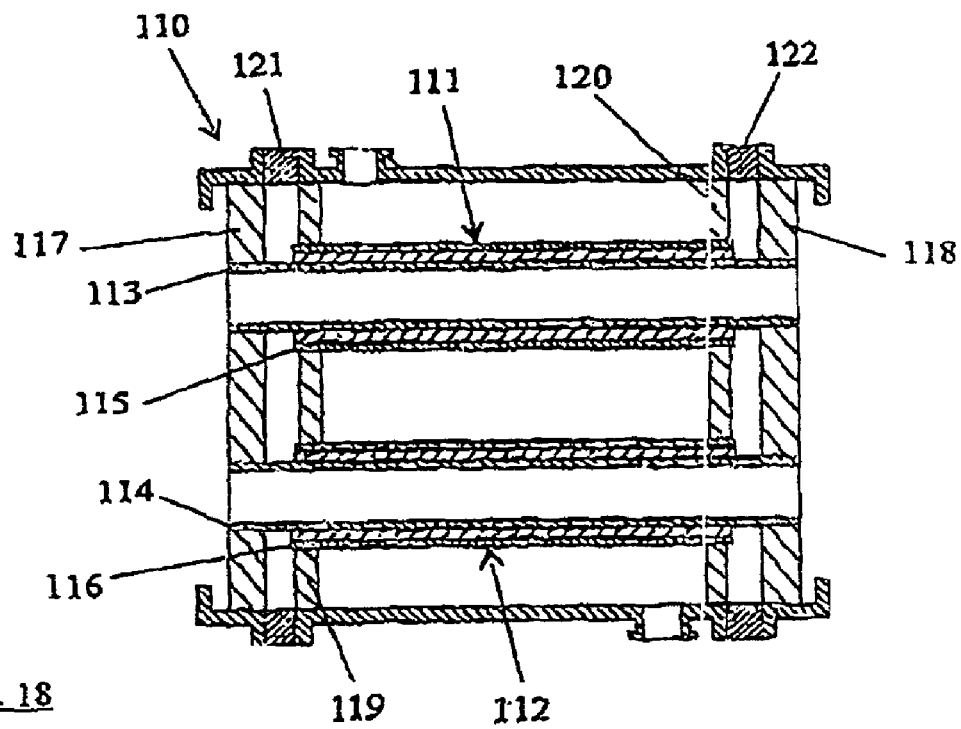

FIG. 18 shows a further exemplary embodiment of a fuel cell 110 with, by way of example, two electrode arrangements 111, 112 in male/male form. The radially internal electrodes 113, 114 project axially at both ends beyond the radially external electrodes 115, 116 and are also held at both ends in particular by electrically conductive, axially external head plates 117, 118, and are electrically connected in parallel. Axially internal head plates 119, 120 are furthermore provided immediately adjacent to the head plates 117, 118, hold the radially external electrodes 115, 116 axially at the end and, in particular being designed to be electrically conductive, connect the electrodes 115, 116 in parallel.

In order to prevent an electrical short circuit between the two pairs of adjacent head plates 117, 119; 118, 120, adjacent head plates 117, 119; 118, 120 are each electrically isolated from one another, for example by means of insulators 121, 122. Insulators 121, 122 such as these may themselves once again also be in the form of head plates, thus in each case resulting in a set of three head plates which also, in particular, touch one another axially, at the ends of the electrode arrangements 111, 112.

The connection of electrode arrangements to head plates as well as, in particular, the production of such sets of three head plates will be explained further with reference to FIGS. 19 to 22.

Figure 19:
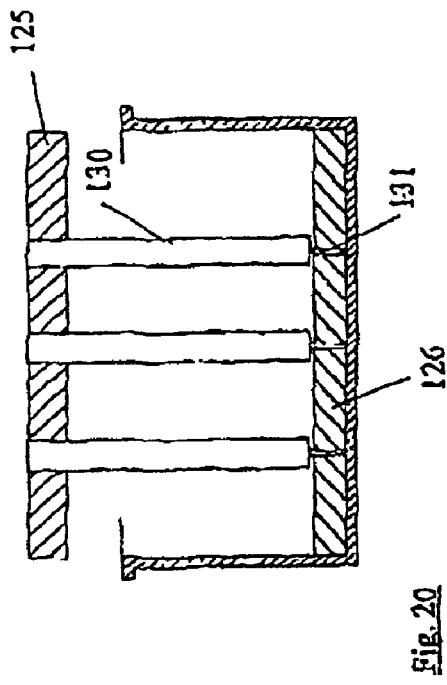
FIGS. 19 to 22 are used to explain the production of head plates and FIGS. 23 to 26 are used to explain the production of an electrode arrangement according to the invention.

FIG. 19 shows a bundle of female/male electrode arrangements 123 which is immersed at the end, with the axially projecting, radially external electrodes 130, in a casting resin 124 which is formed such that it is conductive. The outer electrodes 130 are thus conductively connected, while the radially internal electrodes 131 preferably end in front of the head plate 125 produced in this way, as shown in FIG. 20.

Figure 20:
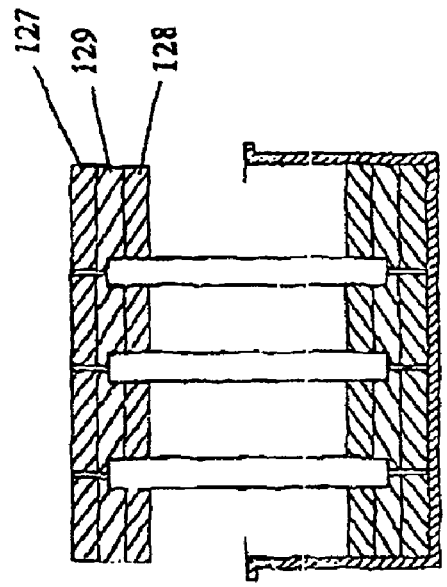

As shown in FIG. 20, the radially internal electrodes 131 are held in a corresponding manner in a head plate 126 composed of a casting resin, plastic or the like which is formed such that it is conductive, in which case it is necessary to ensure that this casting resin for the head plate 126 does not also result in the outer electrodes 130 being connected to one another.

Figure 21:
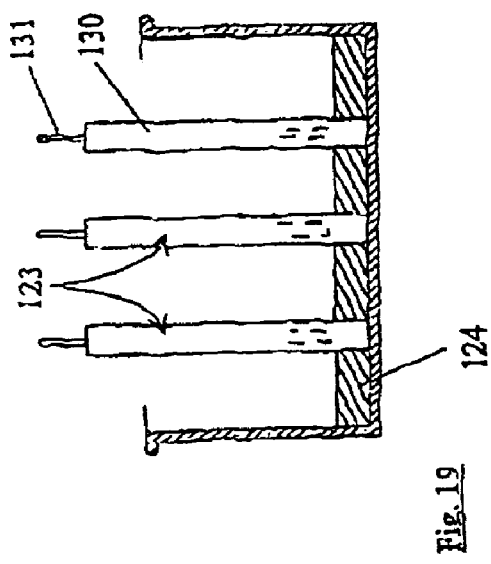

As shown in FIG. 21, the region of the axial outlet of the inner electrode 132 from the outer electrode 133 can be sealed by a third head plate 134, which is immediately adjacent and is composed of an electrically insulating casting resin.

Figure 22:
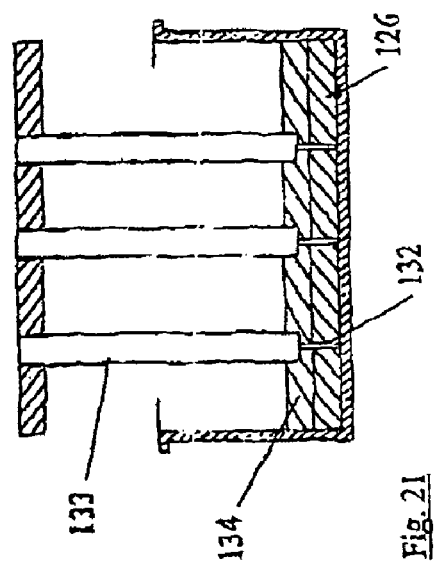
Figure 23:
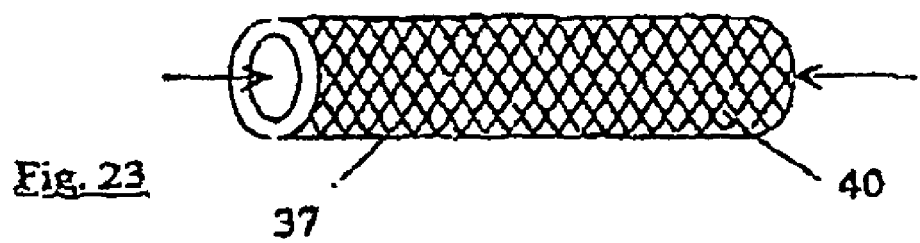

In the same way, if the electrode arrangement is in male/male form as shown in FIG. 22, a set of three head plates can be produced, with a non-conductive head plate 129 held by two conductive head plates 127, 128.

Figure 24:
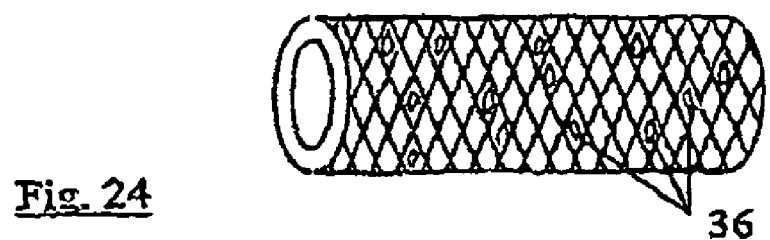

A production method for an electrode arrangement will be explained further with reference to FIGS. 23 to 26. A hollow fiber 40, in particular a filament having a number of lumina, is woven or cast, for example from carbon fibers, in a manner known per se. In particular, as indicated by the arrows in FIG. 23, a woven hollow fiber 40 may be upset regularly. The upsetting process enlarges the diameter of the hollow fibers or of a filament while increasing the size of the gaps in the woven structure and shortening the length, and catalyst particles 36 may be deposited in the gaps in the material, for example on the outer envelope surface 37, as shown in FIG. 24. Once there is no load on the hollow fibers, these catalyst particles 36 are held securely in the material of the electrode.

Alternatively, it is possible to include such a catalyst within a fiber, for example a silicon-titanium-carbide fiber, which is wound around the hollow fiber or the filament.

If required, a hollow fiber or the filament can be produced from a fiber such as this which already contains a catalyst.

The hollow fiber provided with the catalyst or the filament is furthermore also provided, for example coated, with a membrane 38.

Figure 25:
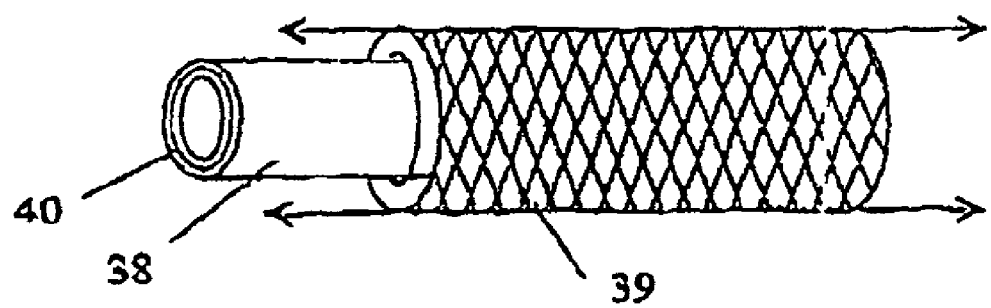
Figure 26:
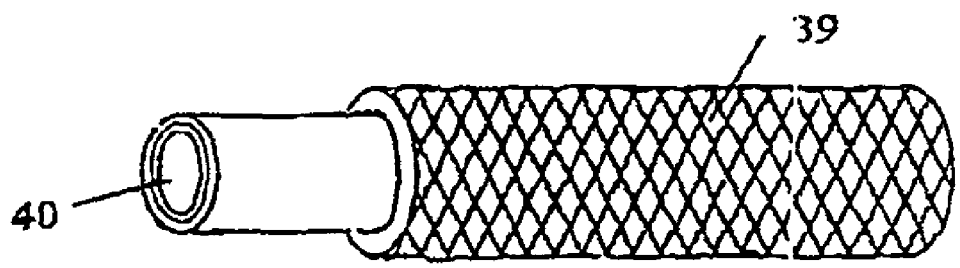

A woven stocking 39 is furthermore pulled over this self-supporting microreactor, which in particular also supports the catalyst and/or the membrane, with this woven stocking 39 once again being composed, for example, of a carbon fiber, as shown in FIG. 25. The woven stocking 39 can be shrunk without any play and firmly onto the inner electrode, as the second electrode, by pulling in the direction of the arrow. This results in a highly robust electrode arrangement, which may also be available in the form of endless material as well. This ensures that such electrode arrangements can be produced at low cost. In this case of this electrode arrangement as well, the electrodes themselves form the capillary supporting structure and the catalyst together with the membrane are applied to the electrically conductive electrodes, with the membrane not forming the capillary supporting structure (as in the prior art) to which the catalyst and a conductor are applied as an electrode.

The invention claimed is:

1. A method for producing an electrode arrangement for use in a fuel cell, said method comprising:
   providing a filament comprising a supporting core and a plurality of webs extending radially from said core and axially along a length of said filament, said filament forming a radially internal, electrically conductive first electrode, said filament comprising a hollow fiber provided with a catalyst, said hollow fiber having an outer envelope surface;
   providing a membrane over said outer envelope surface, said membrane having a radially internal envelope surface separated from said core by said webs, said membrane and said webs of said filament together forming a plurality of separate flow channels such that said membrane defines a portion of each of said separate flow channels and said filament defines another portion of said each of said separate flow channels;
   pulling a woven stocking over said filament so that said woven stocking surrounds at least a portion of said filament and fits onto said at least a portion of said filament; and
   pulling said woven stocking over said membrane, said woven stocking forming a second electrode.

2. The method as in claim 1, further comprising producing said hollow fiber from a fiber containing a catalyst.

3. The method as in claim 2, wherein said stocking has pores which have been enlarged by upsetting, said method further comprising incorporating catalyst particles in said pores.

4. The method as in claim 1, wherein said stocking is subjected to an upsetting process.

5. The method as in claim 1, wherein said filament is woven.

6. The method as in claim 1, wherein said filament is formed with a fiber containing a catalyst.

7. The method as in claim 6, wherein said fiber is a silicon-titanium-carbide fiber.

8. The method as in claim 1, further comprising winding a fiber around the filament, wherein said fiber carries a catalyst.

9. The method as in claim 8, wherein said fiber is a silicon-titanium-carbide fiber.

10. The method as in claim 1, wherein said the step of pulling comprises pulling the woven stocking over the filament so that the woven stocking fits onto the portion of the filament without play.

\* \* \* \* \*